United States Patent

Lai et al.

[11] Patent Number: 5,946,081
[45] Date of Patent: Aug. 31, 1999

[54] METHOD AND APPARATUS FOR REDUCING THE NOISE IN THE RECEIVER OF A LASER RANGE FINDER

[75] Inventors: Yi-Ren Lai, Taichung; Pie-You Chien, Panchiao, both of Taiwan

[73] Assignee: Asia Optical Co., Inc., Taichung, Taiwan

[21] Appl. No.: 08/987,114

[22] Filed: Dec. 8, 1997

[51] Int. Cl.$^6$ ................................................. G01C 3/00
[52] U.S. Cl. ...................................... 356/5.05; 356/5.01
[58] Field of Search ...................... 356/3.01, 5.15

[56] References Cited

U.S. PATENT DOCUMENTS

| | | | |
|---|---|---|---|
| 4,770,526 | 9/1988 | Manhart et al. | 356/5 |
| 4,827,317 | 5/1989 | Mizushima et al. | 356/73.1 |
| 4,888,477 | 12/1989 | Nankivil | 250/201 |
| 5,046,839 | 9/1991 | Krangle | 356/5 |
| 5,157,403 | 10/1992 | Urkowitz | 342/111 |
| 5,221,956 | 6/1993 | Patterson et al. | 356/28 |
| 5,257,121 | 10/1993 | Steinberg . | |
| 5,359,404 | 10/1994 | Dunne | 356/5 |
| 5,612,779 | 3/1997 | Dunne | 356/5.01 |
| 5,652,651 | 7/1997 | Dunne | 356/5.01 |

*Primary Examiner*—Stephen C. Buczinski

[57] ABSTRACT

A method and apparatus for reducing the noise of a laser range finder. The laser range finder includes a high voltage silent circuit, a logarithmic amplifier and a sun noise averaging amplifier. The high voltage silent circuit shuts down the switched power supply controller of the high voltage power supply to reduce the noise coupled from the high voltage power supply when the receiver of the laser range finder is in a receiving mode. The logarithmic amplifier provides dynamic gain control for the receiver to avoid signal saturation and improve the signal to noise ratio of the received signal. The sun noise averaging amplifier provides an amplified average sun noise which automatically adjusts the threshold voltage of detecting the distance signal from a target.

10 Claims, 5 Drawing Sheets

METHOD AND APPARATUS FOR REDUCING THE NOISE IN THE RECEIVER OF A LASER RANGE FINDER

The present invention relates to laser range finding, and more specifically to a method and apparatus for reducing the noise in the receiver of a laser range finder in order to improve the precision and ability of ranging a target.

BACKGROUND OF THE INVENTION

A range finder based on laser technique has been successfully developed by Laser Tech Co., as disclosed in U.S. Pat. No. 404,779,552. The range finder can range 1 Km with precision within 1 m and includes a laser diode as a light source. There are two major drawbacks in the techniques employed in the prior arts. First, a method of fast charging and slow discharging is used to achieve the function of expanding the receiving time. Therefore, the time period (about 6.6 $\mu$s) when the receiving circuit receives the respective echo light after the laser diode transmits the light, is expanded about 100 times. The time period is transformed into the distance by counting the samples (about 8 Mhz) at a low speed clock. The circuit in the finder is desired to use a current source with high accuracy to meet the requirement of fast charging and slow discharging which makes the device more unstable. Second, automatical threshold adjustment is used to optimize the sensitivity of the receiving circuit. However, the feedback sensitivity is too high to control.

SUMMARY OF THE INVENTION

The object of the present invention is to provide a method to optimize the sensitivity of a laser range finder such that the requirement of high accuracy is achieved by automatically adjusting the threshold voltage of the receiving circuit in the finder. According to the present invention, the accuracy is within 0.5 m. What this invention emphasizes is that the threshold voltage is adjusted a little by the sunlight noise without feedback operation.

According to the present invention, a product has been successfully developed and has the features as follows:

1. There is an advantage of low power consumption for the present invention because the time period of transmitting and receiving the laser is converted into a voltage and then the voltage is transformed into a respective distance such that only a 9 V battery as a power supply is needed.

2. The accuracy can be within 0.5 m.

3. The output power of a semiconductor laser used in the present invention is from 24 W to 38 W and the pulse width is from 20 ns to 50 ns in order to measure a concrete building target 1 Km away.

To further increase the accuracy of the laser range finder of the present invention, a user may set the number of measurements in the laser range finder when ranging a target. By transmitting a laser light multiple times and receiving multiple returned data, all data can be averaged to acquire more precise distance measurement.

The receiver of the present invention includes three primary devices, a high voltage silent circuit, a logarithmic amplifier and a first stage amplifier to reduce the noise. The high voltage silent circuit may shut down the switched power supply controller to minimize the noise while the detector of the receiver is in a receiving mode. The logarithmic amplifier is used in the receiver to avoid the saturation phenomenon caused by strong echo waves due to a target at short distance. The logarithmic amplifier, the first stage amplifier and a second stage amplifier form a matching filter to obtain optimal signal-to-noise ratio (S/N). The sun noise is amplified by the first stage amplifier and averaged to form an average sun noise for adjusting the threshold voltage in order to optimize the sensitivity of the receiver.

Other features and advantages of the present invention will become apparent from the following description which refers to the accompanying drawings.

DETAILED DESCRIPTION OF THE PREFERRED EMBODIMENTS

Figure 1:
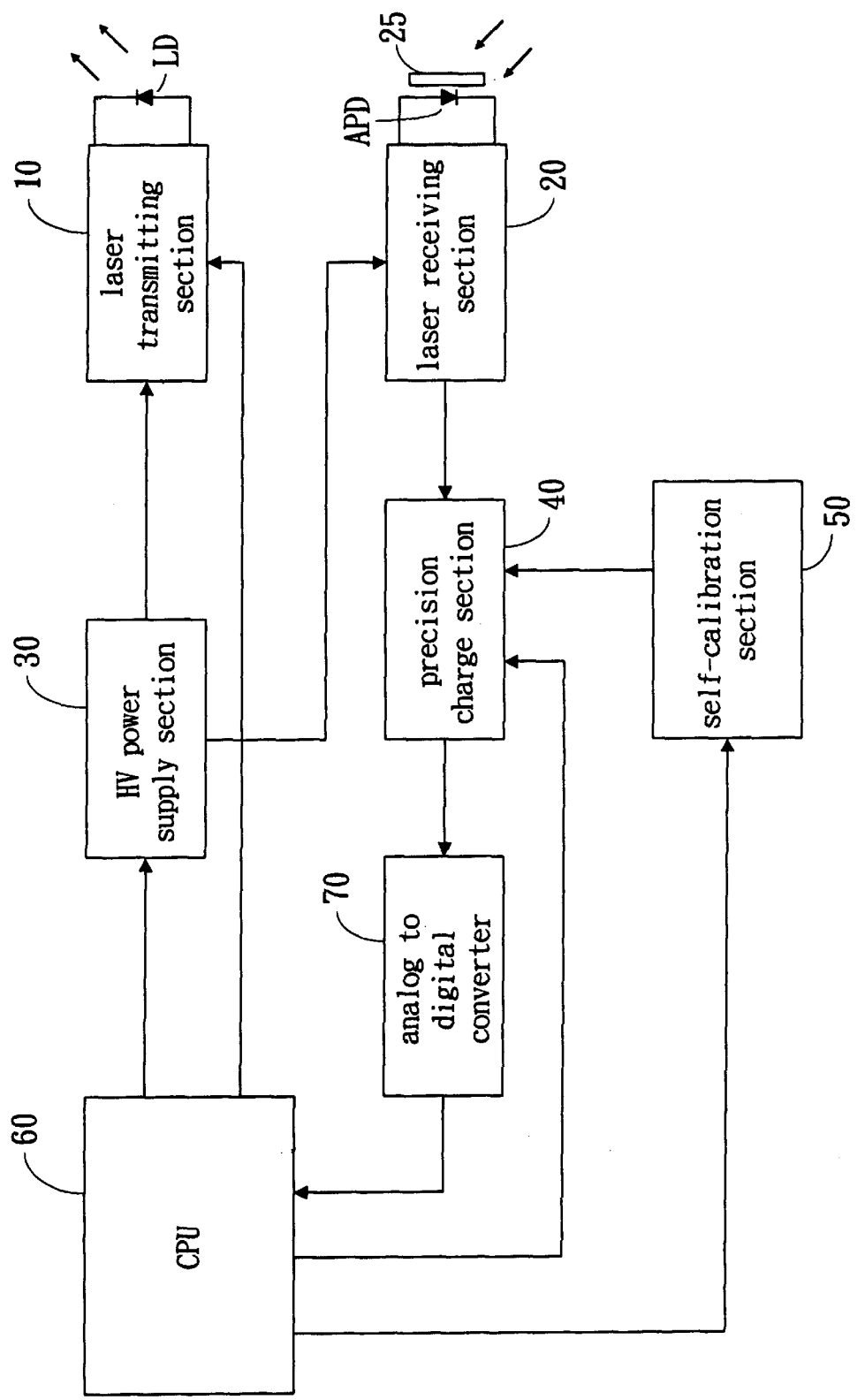
FIG. 1 shows a functional block diagram of a laser range finder in the present invention.

With reference to FIG. 1, the laser range finder of the present invention comprises a laser transmitting section 10, a laser receiving section 20, a high voltage (HV) power supply 30, a precision charge section 40, a self-calibration section 50, a CPU 60 and an analog to digital converter 70.

The laser transmitting section 10 receives a desired high voltage provided by the HV power supply 30 and a trigger signal from the CPU 60 to make a laser diode LD transmit laser light at an appropriate moment.

The laser receiving section 20 receives a desired detector bias voltage to receive and amplify the echo laser reflected by the target, and adjust the highest working sensitivity.

The precision charge section 40 transforms the time difference between the transmitted pulse and the received pulse by an internal R/S flip-flop (not shown) into a respective pulse width and then converts the pulse width into a respective voltage ratio through a charge circuit with a linear capacitor.

The self-calibration section 50 compensates for the variation of the current source and the capacitance due to the temperature change.

The CPU 60 provides desired timing signals for the above devices.

Because the object of the present invention is to provide a method for reducing the noise, only the laser transmitting section 10, the laser receiving section 20, the HV power supply 30 and the CPU 60 are further illustrated in the following description.

To optimize the working status of the laser receiving section 20, it is quite important to deal with the noise. There are primarily three noise sources including:

1. The coupling noise from the switched power supply controller circuit of the HV power supply 30.

2. The white noise from the sunlight.

3. Other coupling noise from the other devices.

The time from transmitting to receiving is about 6.6 $\mu$s for a distance of 1 Km because the laser range finder operates in a synchronous mode. Therefore, only the noise within the 6.6 $\mu$s may influence the laser range finder and other noise out of the time period can be ignored. The concept associated with the present invention is to reduce the noise source as much as possible during the measuring period.

Figure 2:
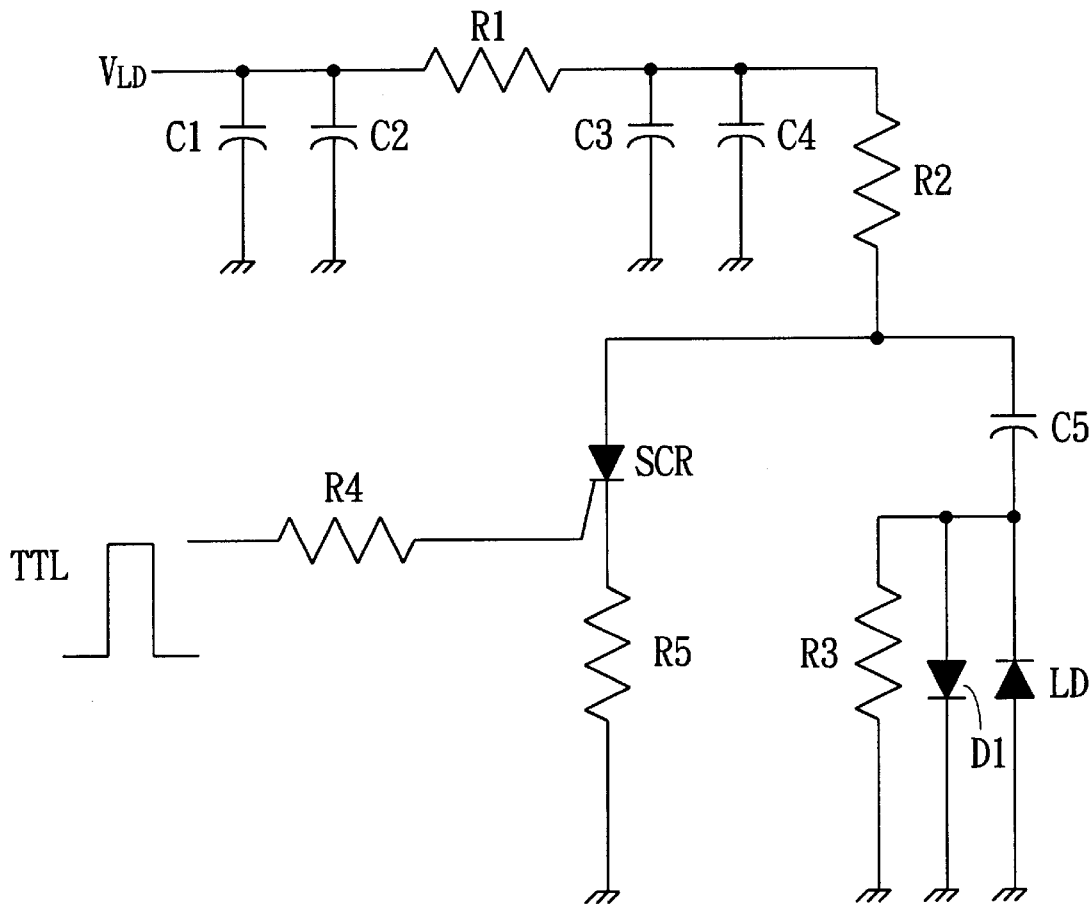
FIG. 2 illustrates a schematic circuit diagram of a transmitting portion of the finder in the present invention.

Based on the above concept, the present invention employs the circuit for the laser transmitting section, as shown in FIG. 2, to reduce the noise produced by the laser transmitting section 10. As can be seen from FIG. 2, the number of components of the circuit are few and can be implemented in a small box to avoid the interference of E-M wave. In FIG. 2, capacitors C1, C2, C3 and C4 and the resistor R1 form a $\pi$ filter to eliminate the interference of the HV power supply 30. The resistor R2 and the capacitor C5 form a charge circuit. The capacitor C5, the laser diode LD, the fast diode D1, the load resistor R3 and the SCR construct a discharge circuit. The charge and discharge circuits are used to generate a laser light (as the timing diagram illustrated in FIG. 5). The trigger time is determined by a TTL positive edge signal which is imposed on the resistors R4 and R5 to trigger the SCR. The timing is controlled by the CPU 60.

Figure 3:
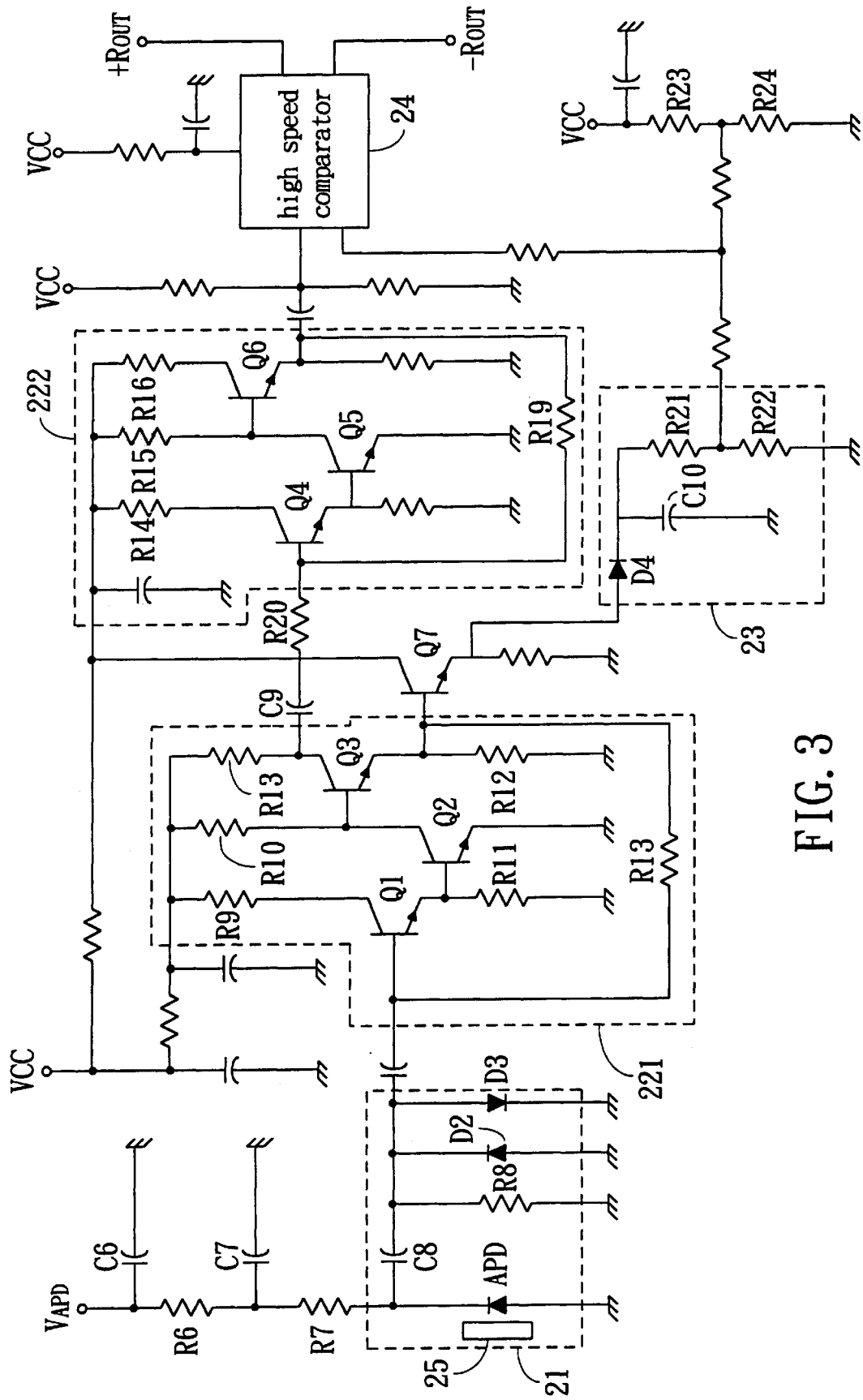
FIG. 3 illustrates a schematic circuit diagram of a receiving portion of the finder in the present invention.

To make the laser receiving section 20 work in optimal sensitivity by adjusting the threshold voltage according to the detected sun-noise, the following circuits are used in the present invention. In FIG. 3, the laser receiving section 20 includes a log amplifier 21, a first stage amplifier 221, a second stage amplifier 222 a sun-noise averaging circuit 23, a high speed comparator 24 and an optical band-pass filter 25.

The bias of the detector APD is generated by the $\pi$ filter which consists of the capacitors C6, C7 and a resistor R6 to eliminate the interference of the HV power supply 30 and the high voltage coupling noise from the laser transmitting section 10 and the laser receiving section 20.

The above optical band-pass filter 25 is placed in front of the detector APD to filter out most of the sun-noise.

The load resistor R7 connects the resistor R6 to the detector and the log amplifier 21 consisting of the capacitor C8, the resistor R8 and the fast diodes D2 and D3 which are used to provide a dynamic range for the laser receiving section 20. Accordingly, similar to AGC, the gain decreases as the target is near and the gain increases as the target is far away.

Three transistors Q1, Q2 and Q3 (which are low noise transistors used in the present invention) and five resistors R9, R10, R11, R12 and R13 form a first stage amplifier 221 which transforms the laser signal received by the APD into a voltage signal. The first stage amplifier 221 and the log amplifier 21 form a band-pass filter. Suitable parameters are selected for the band-pass filter to match the frequency response of the laser pulse.

A second stage amplifier 222 consists of transistors Q4, Q5 and Q6 and resistors R14, R15, R16, R17, R18 and R19. The amplifier 222 is coupled to the drain of the transistor Q3 through a resistor R20 and a capacitor C9. Thus, another voltage amplifier with a band-pass filter is obtained. Accordingly, a matching filter 22 composed of the log amplifier 21, the first stage amplifier 221 and the second stage amplifier 222 may generate a signal corresponding to the laser pulse to obtain an optimal S/N.

The output of the first stage amplifier 221 passes a transistor Q7 as an emitter follower through a rectifying diode D4, a capacitor C10 and the divider resistors R21 and R22 (i.e., the sun-noise averaging circuit 23) to obtain an average noise for the first stage amplifier 221. The average noise corresponding to the white noise in the optical band-pass filter 25, is induced by the sunlight. For the coupling noise generated by the HV power supply section 30, the HV power supply section 30 is automatically shut down by a voltage feedback circuit (as illustrated in the following description) because the high voltage is constructed in advance.

The threshold voltage of a high speed comparator 24 is adjusted by the output voltage of the average sun-noise and the fixed threshold voltage formed by the resistors R23 and R24. The threshold voltage will increase when the sun-noise increases and the threshold voltage will decrease when the sun-noise decreases.

Figure 5:
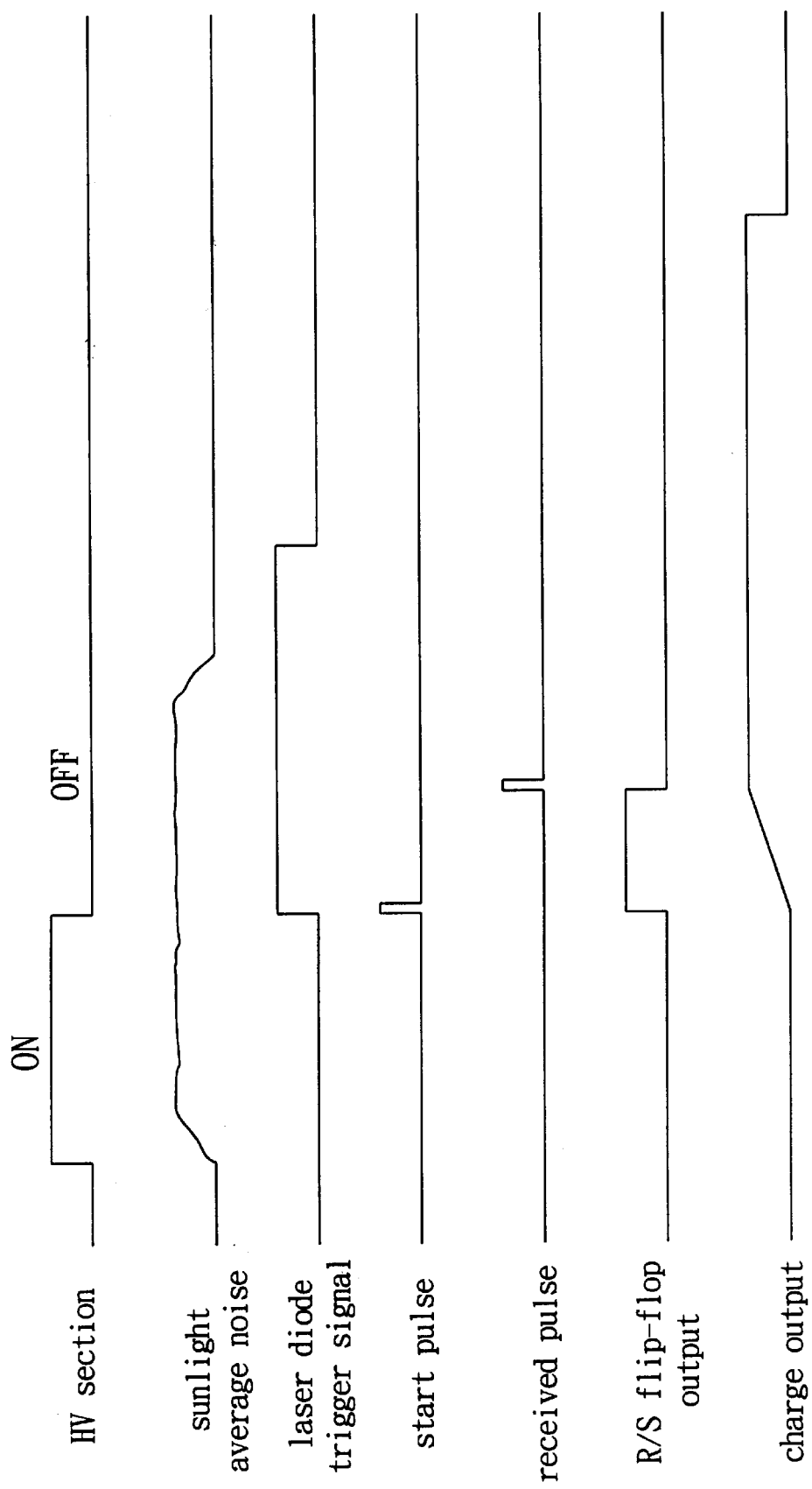
FIG. 5 shows a timing diagram of the reduced noise for the sunlight noise, the receiver and the transmitter.

Before the laser transmit section 10 transmits, the sun-noise averaging circuit 23 is constructed by the APD, which is provided by the HV power supply section 30. The respective timing diagram is illustrated in FIG. 5.

Figure 4:
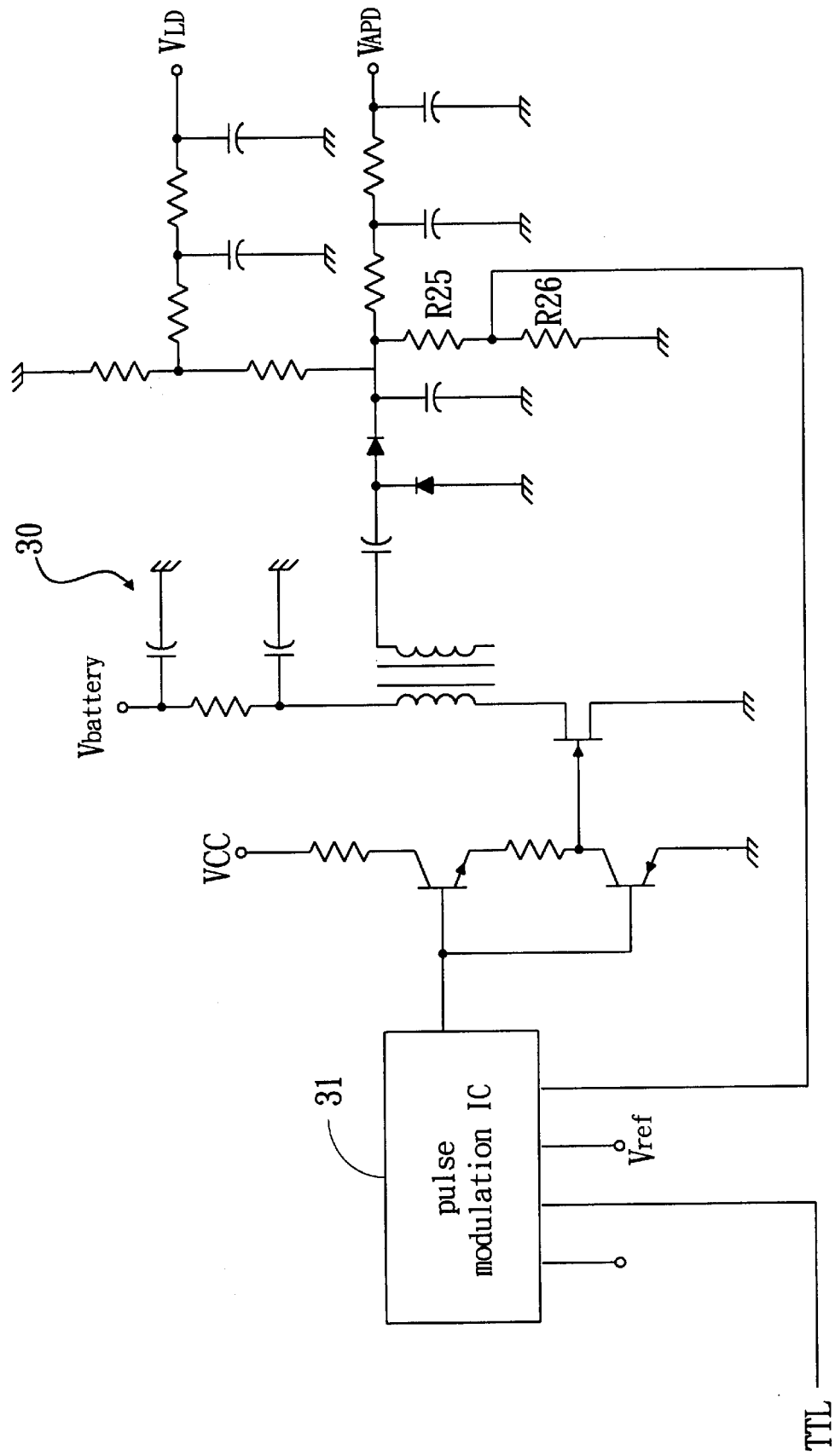
FIG. 4 illustrates a schematic diagram of a high voltage power supply in the present invention.

To minimize the noise of the APD during receiving, the present invention employs the following design. With reference to FIG. 4, a pulse modulation IC 31 (TL494 is used in the present invention) in the HV power supply section 30 controls the bias $V_{LD}$ and $V_{APD}$, which are provided for the laser diode LD and the APD, respectively. The high voltage generated by the HV power supply section 30 is controlled by the negative feedback of the transistors R25 and R26, and the voltage $V_{REF}$. Due to a very low consumption current for the $V_{APD}$, the pulse width of the pulse modulation IC 31 will shut down the high voltage pulse width through the above negative feedback (as shown in FIG. 5) when the laser transmitting section 10 does not work. The CPU 60 will provide a TTL signal to shut down the pulse modulation IC 31 for a period greater than 6.6 $\mu$s to keep the oscillator of the HV power supply 30 in a silent status after the laser light is transmitted.

As the above-mentioned, the present invention provides a solution to reduce the received noise of the laser range finder which can successfully overcome the drawbacks in the prior arts.

Although only the preferred embodiments of this invention were shown and described in the above description, it is requested that any modification or combination that comes within the spirit of this invention be protected.

What is claimed is:

1. An apparatus for reducing noise of a receiver in a laser range finder, comprising:
    a transmitter;
    a receiver comprising:
        a detector for detecting a laser pulse signal;
        a matching filter for converting the detected laser pulse signal and generating a distance signal, said matching filter having a frequency response for matching the frequency response of said laser pulse and increasing the signal to noise ratio of said distance signal;
        a sun noise averaging circuit for measuring average sun noise;
        a threshold adjusting circuit for generating a threshold level according to said average sun noise; and
        a high speed comparator for comparing said distance signal with said threshold level;
    a high voltage power supply having a switched power supply controller for providing a high voltage to said transmitter; and
    a high voltage silent circuit for shutting off said switched power supply controller and reducing noise generated by said switched power supply controller and a coupling effect between said transistor and said receiver when said receiver is in a receiving mode.

2. The apparatus according to claim 1, a bias voltage is provided to said detector from said high voltage power supply through a π filter for filtering an interference signal from said high voltage power supply and reducing coupling between said transmitter and said receiver.

3. The apparatus according to claim 1, said receiver further comprising an optical band-pass filter placed in front of said detector for filtering out sun noise.

4. The apparatus according to claim 1, said high voltage power supply further comprising a voltage supplying circuit for providing said bias voltage to said detector in said receiver, said voltage supplying circuit having a negative feedback control for controlling said high voltage silent circuit, and said switched power supply controller being shut off when said receiver is in a receiving mode.

5. The apparatus according to claim 4, wherein said negative feedback control is sent to a pulse modulation integrated circuit for controlling said high voltage silent circuit.

6. The apparatus according to claim 1, said matching filter further comprising a logarithmic amplifier for reducing strong noise due to a returned laser pulse from a target at a short distance to avoid the saturation of signal in said receiver.

7. The apparatus according to claim 6, said logarithmic amplifier comprising a plurality of resistors, capacitors and fast diodes coupled together for increasing the dynamic range of receiving a laser pulse signal.

8. The apparatus according to claim 6, said matching filter further comprising a first stage amplifier coupled to said logarithmic amplifier and a second stage amplifier coupled to said first stage amplifier, said second stage amplifier sending an amplified distance signal to said high speed comparator.

9. The apparatus according to claim 8, said first stage amplifier having an emitter follower connecting to said sun noise averaging circuit, said sun noise averaging circuit comprising a rectify diode connected to a capacitor and a divider circuit.

10. The apparatus according to claim 9, said threshold adjusting circuit generating said threshold level according to a combined voltage signal of an average sun noise signal from said divider circuit and a fixed threshold voltage from a fixed voltage divider circuit.

* * * * *